(12) United States Patent
Niwa (10) Patent No.: US 12,365,259 B2
(45) Date of Patent: Jul. 22, 2025

(54) CHARGING CABLE, CHARGING SYSTEM INCLUDING THE SAME, AND METHOD OF CHARGING VEHICLE WITH ABNORMALITY DETECTION

(71) Applicant: TOYOTA JIDOSHA KABUSHIKI KAISHA, Toyota (JP)

(72) Inventor: Yamato Niwa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 839 days.

(21) Appl. No.: 17/573,893

(22) Filed: Jan. 12, 2022

(65) Prior Publication Data
US 2022/0242264 A1 Aug. 4, 2022

(30) Foreign Application Priority Data

Feb. 1, 2021 (JP) .................. 2021-014339

(51) Int. Cl.
*B60L 53/62* (2019.01)
*B60L 53/16* (2019.01)
*B60L 53/18* (2019.01)
*B60L 53/66* (2019.01)

(52) U.S. Cl.
CPC ............. *B60L 53/62* (2019.02); *B60L 53/16* (2019.02); *B60L 53/18* (2019.02); *B60L 53/66* (2019.02)

(58) Field of Classification Search
CPC ...................................... B60L 53/62
USPC ....................................... 320/109
See application file for complete search history.

(56) References Cited

U.S. PATENT DOCUMENTS

| | | | |
|---|---|---|---|
| 2010/0007306 A1* | 1/2010 | Fukui | B60L 53/14 320/165 |
| 2010/0207588 A1* | 8/2010 | Lowenthal | B60L 53/65 320/109 |
| 2019/0232813 A1* | 8/2019 | Kusumi | B60L 53/305 |

FOREIGN PATENT DOCUMENTS

| | | |
|---|---|---|
| CN | 107528367 A | 12/2017 |
| EP | 3418108 A1 | 12/2018 |
| JP | 2010-61506 A | 3/2010 |
| JP | 2011-004448 A | 1/2011 |
| JP | 2011004448 * | 1/2011 |
| JP | 5177664 B2 | 4/2013 |
| JP | 2013090543 * | 5/2013 |
| JP | 2017-143693 A | 8/2017 |
| JP | 2019-129671 A | 8/2019 |

* cited by examiner

*Primary Examiner* — Yalkew Fantu
(74) *Attorney, Agent, or Firm* — Sughrue Mion, PLLC (57) ABSTRACT

A charging cable includes: an abnormality detection unit that detects an abnormality in a charging cable; and a CCID controller that outputs a first control pilot signal to a control pilot signal line to notify a vehicle about a rated current of the charging cable. The first control pilot signal provides a notification about the rated current in a state where a duty ratio of the first control pilot signal is controlled to fall within a prescribed range while a frequency of the first control pilot signal is fixed to a specific value. When the abnormality detection unit detects an abnormality, the CCID controller outputs a second control pilot signal for notifying the vehicle about details of the detected abnormality to the control pilot signal line. The second control pilot signal is different in duty ratio from the first control pilot signal.

7 Claims, 10 Drawing Sheets

| SIGNAL CHARACTERISTICS | VALUE | NOTE |
| --- | --- | --- |
| FREQUENCY | 1kHz | FIXED VALUE |
| DUTY RATIO | 10%~85% | RATED CURRENT = d × 0.6 [A] |
| | 85%~96% | CHARGING CURRENT = (d−64%) × 2.5 [A] |

| DUTY RATIO | DETAILS ABOUT ABNORMALITY |
|---|---|
| 1% | FIRST ABNORMALITY |
| 2% | SECOND ABNORMALITY |
| 3% | THIRD ABNORMALITY |
| 4% | FOURTH ABNORMALITY |
| 5% | FIFTH ABNORMALITY |
| 6% | SIXTH ABNORMALITY |
| 7% | SEVENTH ABNORMALITY |
| 8% | EIGHTH ABNORMALITY |
| 9% | NINTH ABNORMALITY |

| FREQUENCY | DETAILS ABOUT ABNORMALITY |
|---|---|
| 2kHz | FIRST ABNORMALITY |
| 3kHz | SECOND ABNORMALITY |
| 4kHz | THIRD ABNORMALITY |
| 5kHz | FOURTH ABNORMALITY |
| 6kHz | FIFTH ABNORMALITY |
| 7kHz | SIXTH ABNORMALITY |
| 8kHz | SEVENTH ABNORMALITY |
| 9kHz | EIGHTH ABNORMALITY |
| 10kHz | NINTH ABNORMALITY |

CHARGING CABLE, CHARGING SYSTEM INCLUDING THE SAME, AND METHOD OF CHARGING VEHICLE WITH ABNORMALITY DETECTION

This nonprovisional application is based on Japanese Patent Application No. 2021-014339 filed on Feb. 1, 2021 with the Japan Patent Office, the entire contents of which are hereby incorporated by reference.

BACKGROUND

Field

The present disclosure relates to a charging cable, a charging system including the charging cable, and a method of charging a vehicle.

Description of the Background Art

A vehicle disclosed in Japanese Patent Laying-Open No. 2019-129671 includes a controller that controls plug-in charging. The controller conducts a diagnosis whether a charger is abnormal or not. This diagnosis can be made in the state where a connector is inserted into an inlet when the charger and the vehicle are connected to each other via a charging cable. Then, when the charger is diagnosed as being abnormal, the controller transmits information about the abnormality to an external device (an external server and the like).

SUMMARY

There is a possibility that an abnormality may occur in a charging cable that connects a vehicle and a charger. When the charging cable detects its own abnormality, it is conceivable that a notification about the detection result is provided from the charging cable to the vehicle. The vehicle having received the notification informs an outside entity (a user of the vehicle, a server that manages the charger, and the like) about the abnormality, and thereby, the measures appropriate to the details of the abnormality occurring in the charging cable can be taken.

However, it has conventionally been difficult to provide a notification about particular details of an abnormality occurring in a charging cable from the charging cable to a vehicle. This is because charging cables comply with specific charging standards. For example, it is impractical to newly add a signal line not defined in charging standards in order to provide a notification about the details of an abnormality. It is desirable to provide a notification about particular details of an abnormality in a charging cable from the charging cable to a vehicle in conformity with the conventional charging standards.

The present disclosure has been made to solve the above-described problems, and an object of the present disclosure is to notify a vehicle about details of an abnormality occurring in a charging cable without providing an additional signal line in the charging cable.

(1) A charging cable according to the first aspect of the present disclosure electrically connects a vehicle and a charging facility. The charging cable includes: an abnormality detection unit that detects an abnormality in the charging cable; a control pilot signal line; and a controller that outputs a first control pilot signal to the control pilot signal line to notify the vehicle about a rated current of the charging cable. The first control pilot signal provides a notification about the rated current in a state where a duty ratio of the first control pilot signal is controlled to fall within a prescribed range while a frequency of the first control pilot signal is fixed to a specific value. When the abnormality detection unit detects the abnormality, the controller outputs a second control pilot signal for notifying the vehicle about details of the detected abnormality to the control pilot signal line. The second control pilot signal is different in at least one of a frequency and a duty ratio from the first control pilot signal.

(2) The second control pilot signal provides a notification about the details of the abnormality as a duty ratio of the second control pilot signal is controlled to fall out of the prescribed range.

(3) The second control pilot signal provides a notification about the details of the abnormality as a frequency of the second control pilot signal is controlled to fall within a range not including the specific value.

According to the configuration in the above-described (1) to (3), the frequency and/or the duty ratio are/is changed between the first control pilot signal and the second control pilot signal, to thereby allow switching of the notification about the details (the rated current of the charging cable/the details of an abnormality in the charging cable) that is provided to the vehicle through a control pilot signal line. Therefore, the vehicle can be notified about the details of the abnormality occurring in the charging cable without providing an additional signal line in the charging cable.

(4) The second control pilot signal includes a first signal and a second signal that is output after the first signal is output. The first signal shows switching of a notification provided from the charging cable to the vehicle as a duty ratio of the first signal is controlled to fall out of the prescribed range. The second signal provides a notification about the details of the abnormality as a duty ratio of the second signal is controlled to fall within the prescribed range.

According to the configuration in the above-described (4), the second control pilot signal includes a first signal and a second signal, and the first signal is output before the second signal is output. This allows the vehicle to recognize switching of a notification provided from the charging cable to the vehicle. Thereby, a duty ratio common to the first control pilot signal and the second control pilot signal can be used. As a result, the range of the duty ratio used for providing a notification about the details of the abnormality in the charging cable can be widely ensured.

(5) The abnormality detected by the abnormality detection unit is classified into a first abnormality and a second abnormality. When the abnormality is the first abnormality, the controller outputs the second control pilot signal to the control pilot signal line immediately after detection of the abnormality so as to stop charging of the vehicle. On the other hand, when the abnormality is the second abnormality, the controller outputs the second control pilot signal to the control pilot signal line after charging of the vehicle ends.

According to the configuration in the above-described (5), when the first abnormality (an abnormality that needs to be urgently addressed) occurs, charging of the vehicle is immediately stopped. In contrast, when the second abnormality (an abnormality that does not need to be urgently addressed) occurs, charging can be continued until charging of the vehicle ends.

(6) A charging system according to the second aspect of the present disclosure includes the charging cable and the vehicle. The vehicle includes at least one of: an interface that informs a user about the details of the abnormality; and a communication module that transmits the details of the abnormality to an external server.

According to the configuration in the above-described (6), the user or the external server can take appropriate measures (such as repair of the charging cable) in accordance with the details of the abnormality in the charging cable.

(7) A method of charging a vehicle according to the second aspect of the present disclosure is a charging method using a charging cable including a control pilot signal line. The charging method includes a first step and a second step. The first step includes, when no abnormality is detected in the charging cable, notifying the vehicle about a rated current of the charging cable using a first control pilot signal that is transmitted through the control pilot signal line. The second step includes, when an abnormality is detected in the charging cable, notifying the vehicle about details of the abnormality in the charging cable using a second control pilot signal that is transmitted through the control pilot signal line. The first control pilot signal provides a notification about the rated current in a state where a duty ratio of the first control pilot signal is controlled to fall within a prescribed range while a frequency of the first control pilot signal is fixed to a specific value. The second control pilot signal is different in at least one of a frequency and a duty ratio from the first control pilot signal.

According to the method in the above-described (7), the vehicle can be notified about the details of the abnormality occurring in the charging cable without providing an additional signal line in the charging cable, as in the configuration in the above-described (1).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present disclosure will be hereinafter described in detail with reference to the accompanying drawings, in which the same or corresponding components are denoted by the same reference characters, and the description thereof will not be repeated.

First Embodiment

Configuration of Charging System

Figure 1:
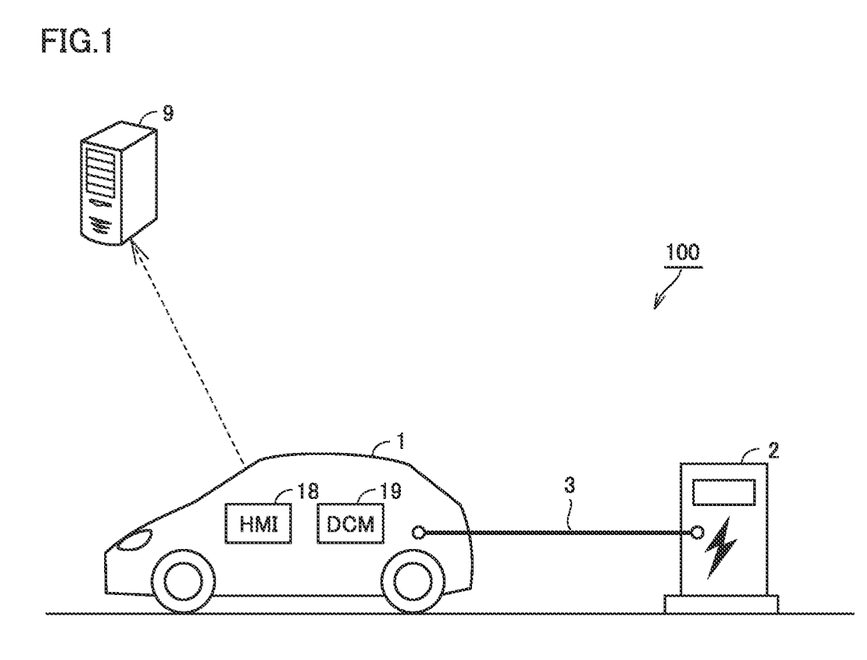
FIG. 1 is a diagram schematically showing an entire configuration of a charging system according to a first embodiment of the present disclosure.

FIG. 1 is a diagram schematically showing the entire configuration of a charging system according to the first embodiment of the present disclosure. Charging system 100 includes a vehicle 1, a charging facility 2, and a charging cable 3.

Vehicle 1 is configured to be plug-in chargeable, which is a plug-in hybrid electric vehicle (PHEV), for example. Vehicle 1 may be a battery electric vehicle (BEV) or may be a plug-in fuel cell electric vehicle (PFCEV).

Vehicle 1 includes a human machine interface (HMI) 18 and a communication module 19. HMI 18 is, for example, an on-vehicle display and configured to inform a user in a vehicle compartment about various pieces of information. Further, using communication module 19, vehicle 1 can transmit various pieces of information to a server 9 (a management server of charging facility 2, and the like) installed outside charging system 100. In place of server 9 or in addition to server 9, the information may be transmitted to a repair tool (not shown) installed in a dealer or the like or may be transmitted to a user's mobile terminal (a smart phone and the like).

Charging facility 2 is a power supply facility of an alternating-current (AC) type and is what is called a "normal charger". Charging facility 2 is capable of providing vehicle 1 with AC power that is supplied from an external power supply 20 (see FIG. 3). Charging facility 2 is, for example, a charger provided on the outer wall and the like of a house but may be a charger installed in a charging stand.

Charging cable 3 is an AC type cable and configured to electrically connect vehicle 1 and charging facility 2.

Figure 2:
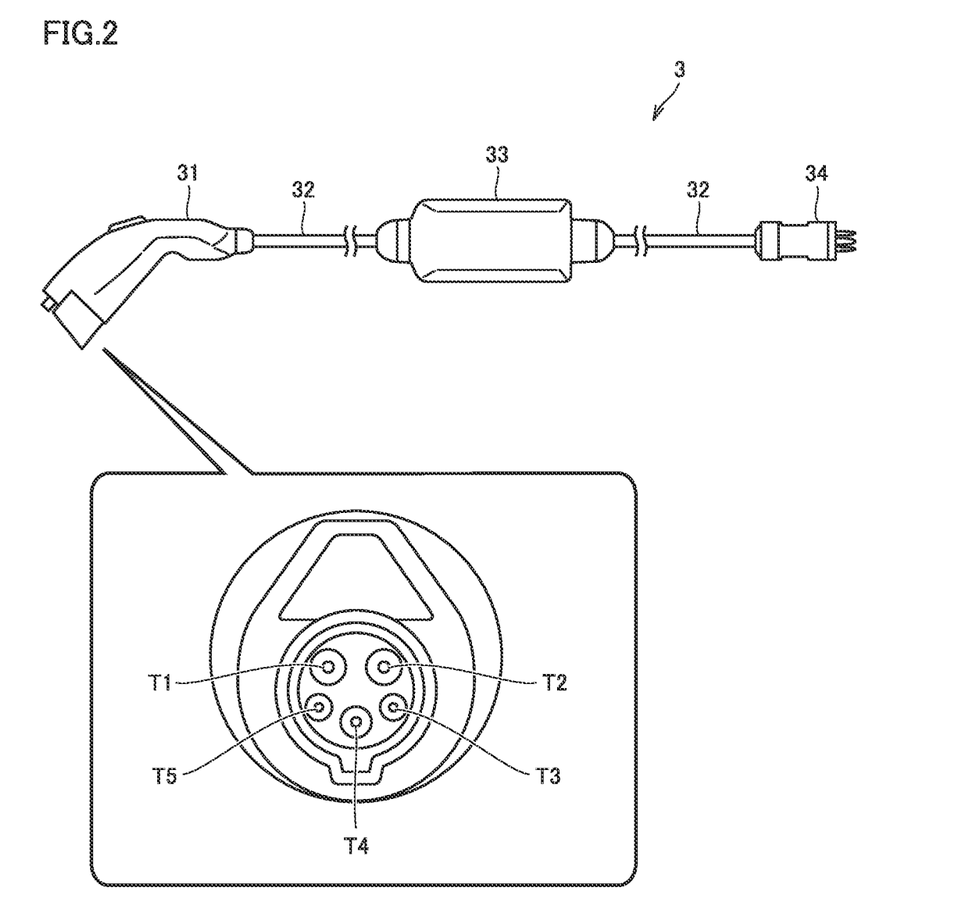
FIG. 2 is a diagram showing an external appearance of a charging cable.

FIG. 2 is a diagram showing an external appearance of charging cable 3. Charging cable 3 in the present embodiment complies with prescribed charging standards, more specifically, with International Standards such as IEC 61851. Charging cable 3 includes a charging connector 31, a cable unit 32, a charging circuit interrupt device (CCID) box 33, and a plug 34.

Charging connector 31 is configured to be inserted into an inlet 13 (see FIG. 3) of vehicle 1. Charging connector 31 includes five terminals of a positive terminal T1, a negative terminal T2, a control pilot terminal T3, a ground terminal T4, and a connector connection terminal T5.

Cable unit 32 electrically connects charging connector 31, CCID box 33, and plug 34. CCID box 33 is a structure body including a current interruption mechanism, which will be described later. Plug 34 is configured to be connected to an outlet 21 (see FIG. 3) provided in charging facility 2.

Figure 3:
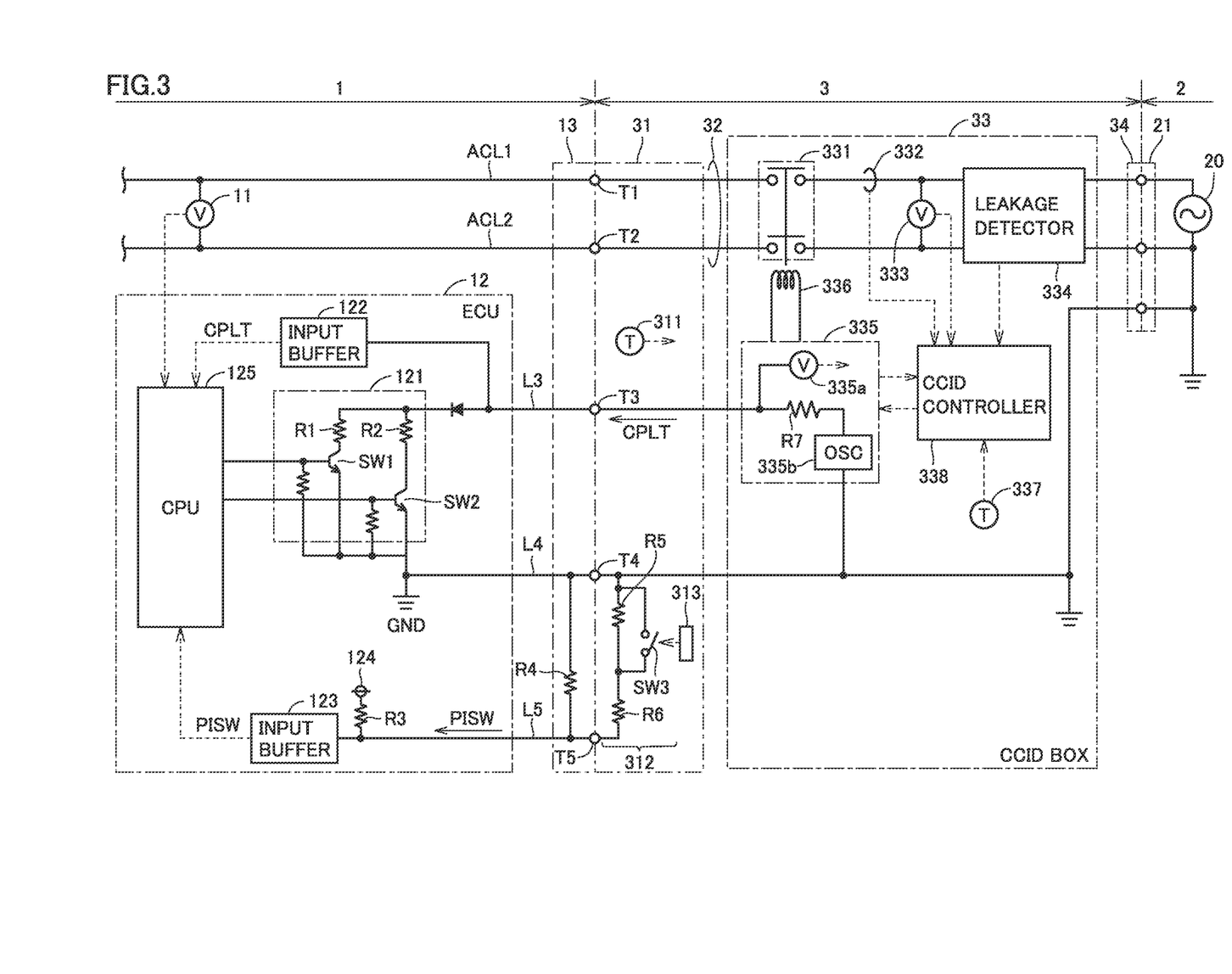
FIG. 3 is a diagram showing an example of a circuit configuration related to plug-in charging of the charging system.

FIG. 3 is a diagram showing an example of a circuit configuration related to plug-in charging of charging system 100. Vehicle 1 includes a voltage sensor 11, an electronic control unit (ECU) 12, an inlet 13, power lines ACL1 and ACL2, a control pilot line L3, a ground line L4, and a connection signal line L5.

Charging connector 31 includes the above-mentioned five terminals. Positive terminal T1 electrically connects power line ACL1 of vehicle 1 and cable unit 32 of charging cable 3. Negative terminal T2 electrically connects power line ACL2 of vehicle 1 and cable unit 32 of charging cable 3. Control pilot terminal T3 is electrically connected to control pilot line L3. Ground terminal T4 is electrically connected to ground line L4. Connector connection terminal T5 is electrically connected to connection signal line L5.

CCID box 33 includes a CCID relay 331, a current sensor 332, a voltage sensor 333, a leakage detector 334, a control pilot circuit 335, an electromagnetic coil 336, a temperature sensor 337, and a CCID controller 338.

CCID relay 331 is electrically connected to cable unit 32. CCID relay 331 is controlled by control pilot circuit 335 to be switched into a conductive state/a non-conductive state. When CCID relay 331 is in a non-conductive state, an electric path inside charging cable 3 is interrupted. When CCID relay 331 is in a conductive state, AC power can be supplied from charging facility 2 (external power supply 20 such as a system power supply) to vehicle 1.

Current sensor 332 detects an AC current flowing through cable unit 32 and outputs a detection value thereof to CCID controller 338. Thereby, CCID controller 338 can sense occurrence of an overcurrent in charging cable 3.

Voltage sensor 333 detects the voltage of the AC power supplied from charging facility 2 and outputs a detection value thereof to CCID controller 338.

Leakage detector 334 is electrically connected to cable unit 32. When leakage detector 334 detects occurrence of electrical leakage in charging cable 3, it outputs the detection result to CCID controller 338. Specifically, leakage detector 334 detects the equilibrium of the currents flowing in opposite directions through cable units 32 provided as a pair. Then, when the equilibrium is lost, leakage detector 334 detects occurrence of electrical leakage. Although not shown, when leakage detector 334 detects electrical leakage, supply of electric power to electromagnetic coil 336 is interrupted according to a control command from CCID controller 338, to thereby bring CCID relay 331 into a non-conductive state.

Control pilot circuit 335 outputs a control pilot signal CPLT to control pilot line L3. Control pilot signal CPLT serves to provide a notification about the rated current of charging cable 3 from control pilot circuit 335 to ECU 12.

Electromagnetic coil 336 is controlled by control pilot circuit 335 to open/close a contact point of CCID relay 331.

Temperature sensor 337 detects the temperature inside CCID box 33 (for example, the temperature of the substrate on which components are mounted) and outputs a detection value thereof to CCID controller 338. Thereby, CCID controller 338 can sense an excessive increase in temperature of CCID box 33.

CCID controller 338 includes a processor such as a central processing unit (CPU), memories such as a read only memory (ROM) and a random access memory (RAM), and an input/output port, all of which are not shown. CCID controller 338 controls control pilot circuit 335 based on the detection values of the respective sensors mentioned above.

More specifically, control pilot circuit 335 includes a voltage sensor 335a, an oscillation circuit 335b, and a resistor R7. Voltage sensor 335a detects the electric potential of control pilot signal CPLT and outputs a detection value thereof to CCID controller 338. When the electric potential of control pilot signal CPLT is a prescribed electric potential (for example, 12V), oscillation circuit 335b prevents oscillation of control pilot signal CPLT. On the other hand, when the electric potential of control pilot signal CPLT decreases below the prescribed electric potential (decreases to 9V, for example), oscillation circuit 335b causes control pilot signal CPLT to oscillate at a specific frequency (1 kHz in the present example) and at a specific duty ratio.

The duty ratio of control pilot signal CPLT is set based on the maximum current (rated current) that can be supplied from charging facility 2 through charging cable 3 to vehicle 1. The rated current is set according to the specifications of the charging cable. Thus, when the type of the charging cable is different, the rated current may also be different. By the duty ratio of control pilot signal CPLT, a notification about the rated current of charging cable 3 is provided from control pilot circuit 335 to ECU 12 in vehicle 1. Based on the duty ratio of control pilot signal CPLT, ECU 12 can sense the maximum current that can be supplied to vehicle 1.

Control pilot signal CPLT is used also as a signal for ECU 12 to remotely control CCID relay 331. Specifically, the electric potential of control pilot signal CPLT is controlled by ECU 12. When the electric potential of control pilot signal CPLT is controlled by ECU 12 to further decrease (decrease to 6V, for example) after notification of the rated current, control pilot circuit 335 supplies a current to electromagnetic coil 336. Thereby, electromagnetic coil 336 generates electromagnetic force. As a result, the contact point of CCID relay 331 is closed and CCID relay 331 is brought into a conductive state. In other words, electric power can be supplied from charging facility 2 through charging cable 3 to vehicle 1.

In addition to the above-mentioned five terminals (T1 to T5), charging connector 31 includes a temperature sensor 311, a connection detection circuit 312, and a push button 313. Further, ECU 12 in vehicle 1 includes a resistor circuit 121, input buffers 122, 123, a power supply node 124, a pull-up resistor R3, and a CPU 125. Inlet 13 includes a resistor R4.

Temperature sensor 311 detects the temperature inside charging connector 31 (for example, the temperatures of positive terminal T1 and negative terminal T2) and outputs a detection value thereof to CCID controller 338. Thereby, CCID controller 338 can sense an excessive increase in temperature of charging connector 31.

Connection detection circuit 312 includes resistors R5, R6 and a switch SW3. Resistors R5 and R6 are connected in series between connection signal line L5 and ground line L4. Switch SW3 is connected in parallel with resistor R6. Switch SW3 is a limit switch, for example. The contact point of switch SW3 is closed in the state where charging connector 31 is reliably fitted into inlet 13. In the state where charging connector 31 is removed from inlet 13 (or the state where fitting between charging connector 31 and inlet 13 is unreliable), the contact point of switch SW3 is opened. Further, when charging connector 31 is removed from inlet 13, the user operates push button 313. The contact point of switch SW3 is opened also by operating push button 313.

Through connection signal line L5, a connection signal PISW showing the state of connection between charging connector 31 and inlet 13 is transmitted. In the state where charging connector 31 is removed from inlet 13, connection signal line L5 is connected to power supply node 124 through pull-up resistor R3, so that connection signal PISW is brought into a high level. In the state where charging connector 31 is connected to inlet 13, connection signal line L5 is connected to ground line L4 through resistors R5 and R6 in charging connector 31 (pulled down), so that connection signal PISW is brought into a low level.

Resistor circuit 121 serves to control, from vehicle 1, the electric potential of control pilot signal CPLT. More specifically, resistor circuit 121 includes pull-down resistors R1, R2 and switches SW1, SW2. Pull-down resistor R1 and switch SW1 are connected in series between control pilot line L3 and a vehicle ground GND. Pull-down resistor R2 and switch SW2 are also connected in series between control pilot line L3 and vehicle ground GND. Each of switches SW1 and SW2 is controlled by a control command from CPU 125 to be conductive/non-conductive.

Input buffer 122 receives control pilot signal CPLT that is transmitted through control pilot line L3 and outputs this control pilot signal CPLT to CPU 125. Input buffer 123 receives connection signal PISW that is transmitted through connection signal line L5 and outputs this connection signal PISW to CPU 125.

Voltage sensor 11 detects the AC voltage between power line ACL1 and power line ACL2 (the voltage of the AC power supplied from charging facility 2) and outputs a detection value thereof to CPU 125.

CPU 125 receives connection signal PISW from input buffer 123 and receives control pilot signal CPLT from input buffer 122. Based on the electric potential level of connection signal PISW, CPU 125 detects the state of connection of charging connector 31 to inlet 13. When charging connector 31 is connected to inlet 13, CPU 125 uses control pilot signal CPLT to remotely control CCID relay 331. The following describes such control of control pilot signal CPLT in greater detail.

Control Pilot Signal

Figure 4:
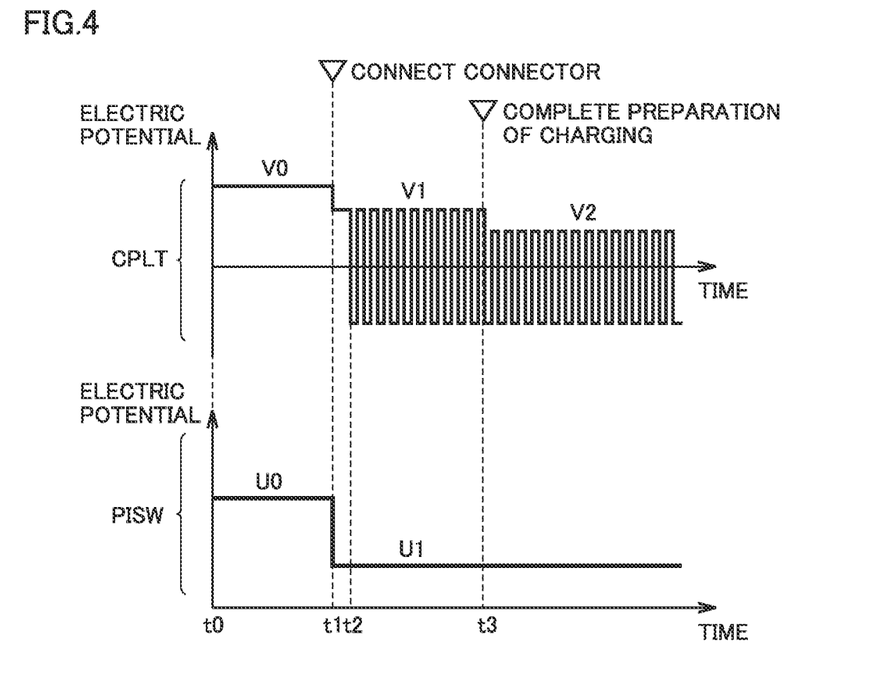
FIG. 4 is a timing chart showing an example of control of a control pilot signal.

FIG. 4 is a timing chart showing an example of control of control pilot signal CPLT. FIG. 4 also shows a change of connection signal PISW. In FIG. 4, the horizontal axis shows elapsed time while the vertical axis shows the electric potential of control pilot signal CPLT and the electric potential of connection signal PISW.

Referring to FIGS. 3 and 4, charging connector 31 is not connected to inlet 13 at initial time t0. The electric potential of connection signal PISW is U0, and the electric potential of control pilot signal CPLT is V0. CCID relay 331 is in a non-conductive state.

When charging connector 31 is connected to inlet 13 at time t1, the electric potential of connection signal PISW decreases from U0 to U1 and the electric potential of control pilot signal CPLT decreases from V0 to V1. Thereby, CCID controller 338 senses that charging connector 31 has been connected to inlet 13.

At time t2, CCID controller 338 controls control pilot circuit 335 (oscillation circuit 335b) such that control pilot signal CPLT oscillates at a prescribed frequency and a prescribed duty ratio on the assumption that the upper limit value of the electric potential is defined as V1. CPU 125 detects the duty ratio of control pilot signal CPLT to thereby acquire the rated current of charging cable 3.

Upon completion of a prescribed process for the preparation before starting power supply (preparation for charging) at time t3, CPU 125 controls switches SW1 and SW2 to thereby lower the electric potential of control pilot signal CPLT from V1 to V2. Then, the upper limit value of the electric potential of control pilot signal CPLT that is oscillating is set at V2. Accordingly, CCID controller 338 switches CCID relay 331 from the non-conductive state to the conductive state. This consequently allows AC power to be supplied from charging facility 2 to vehicle 1.

Figure 5:
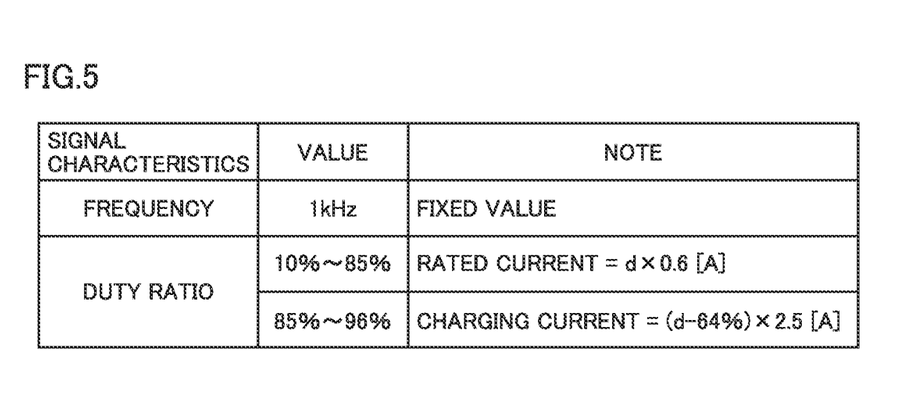
FIG. 5 is a diagram for illustrating prescribed ranges of a frequency and a duty ratio of the control pilot signal.

FIG. 5 is a diagram for illustrating prescribed ranges of the frequency and the duty ratio of control pilot signal CPLT. The above-mentioned International Standards (IEC 61851 and the like) define that a specific fixed value (1 kHz) is used as a frequency of control pilot signal CPLT.

Further, it is also defined that the value falling within the range from 10% to 96% is used as a duty ratio of control pilot signal CPLT. When the duty ratio falls within the range from 10% to 85%, the rated current is represented by the value obtained by multiplying a duty ratio d by 0.6 A. On the other hand, when the duty ratio falls within the range from 85% to 96%, the rated current is represented by the value obtained by subtracting 64% from duty ratio d and then multiplying the result by 2.5 A.

Abnormality in Charging Cable

For ease of understanding in the following description, the control entity on charging cable 3 is simply referred to as charging cable 3 in place of CCID controller 338 and the control entity on vehicle 1 is simply referred to as vehicle 1 in place of CPU 125.

When charging cable 3 detects its own abnormality, it is conceivable that a notification about the detection result is provided from charging cable 3 to vehicle 1. Vehicle 1 having received the notification uses communication module 19 to inform an outside entity (a user of vehicle 1, a server that manages charging facility 2, and the like, each of which is not shown) about occurrence of an abnormality. Thereby, the measures appropriate to the details of the abnormality occurring in charging cable 3 can be taken.

However, it has conventionally been difficult to provide a notification about particular details of the abnormality occurring in charging cable 3 from charging cable 3 to vehicle 1. This is because charging cable 3 complies with specific charging standards (International Standards) as described with reference to FIGS. 3 to 5. It is impractical to newly add a signal line that is not defined in the charging standards for the purpose of providing a notification about the details of an abnormality. It is desirable to provide a notification about particular details of the abnormality occurring in charging cable 3 from charging cable 3 to vehicle 1 in conformity with the conventional charging standards.

Thus, the present embodiment adopts a configuration in which, when an abnormality occurs in charging cable 3, among the duty ratios of control pilot signal CPLT, a duty ratio that is not used for providing a notification of the rated current is allocated for each details of the abnormality in charging cable 3.

Figure 6:
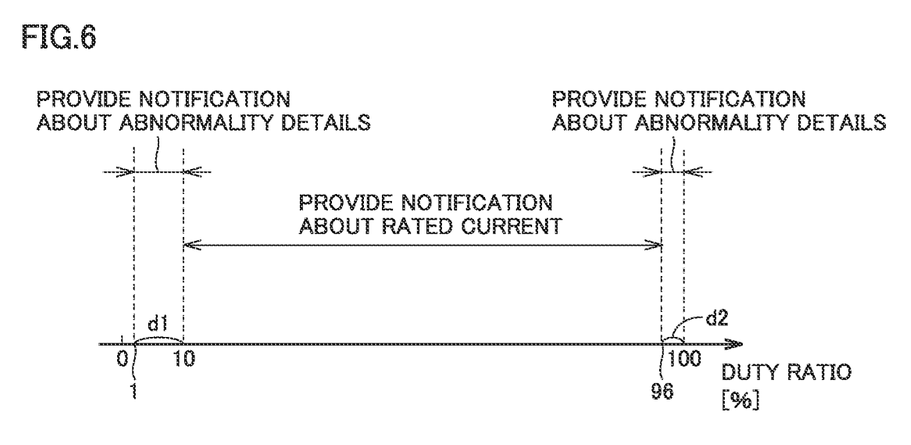
FIG. 6 is a diagram showing an entire image of information allocated to the control pilot signal in the first embodiment.

FIG. 6 is a diagram showing an entire image of information allocated to control pilot signal CPLT in the first embodiment. In the first embodiment, the duty ratio falling out of the range of the duty ratio described with reference to FIG. 5, i.e., the duty ratio falling within a range d1 of 1% or more and less than 10% (a range of 1%≤d1<10%) and/or a range d2 of more than 96% and less than 100% (a range of 96%<d2≤100%), is allocated for providing a notification about the details of the abnormality in charging cable 3.

Figure 7:
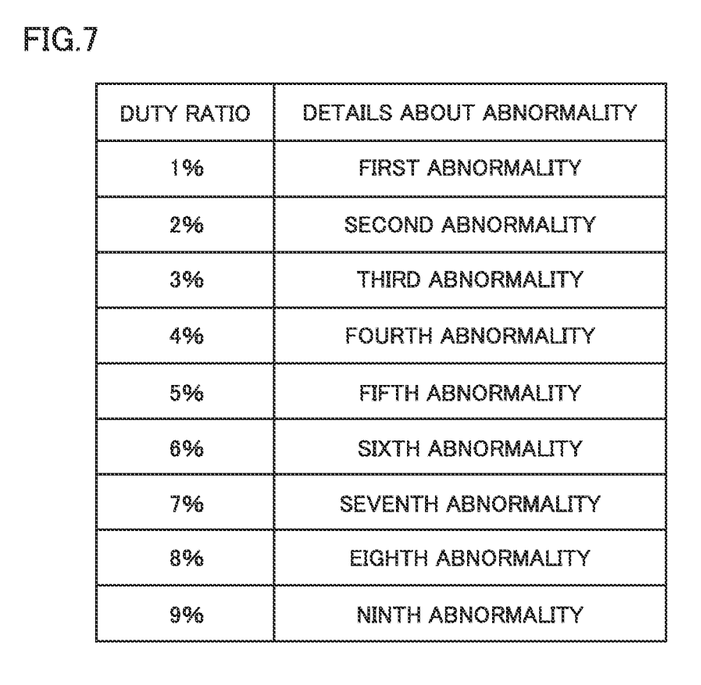
FIG. 7 is a conceptual diagram showing allocation of notification details about an abnormality to the control pilot signal in the first embodiment.

FIG. 7 is a conceptual diagram showing allocation of the notification details about an abnormality to control pilot signal CPLT in the first embodiment. In the present example, a different type of abnormality is allocated for each 1% of the duty ratio of control pilot signal CPLT. When the duty ratio is 1%, it means that the first abnormality occurs in charging cable 3. When the duty ratio is 2%, it means that the second abnormality occurs in charging cable 3. When the duty ratio is 3%, it means that the third abnormality occurs in charging cable 3. The same is applied also in the case where the duty ratio is 4% or more.

The first to ninth abnormalities may include various abnormalities such as an excessive increase in temperature of charging connector 31, an excessive increase in temperature of the substrate housed in CCID box 33, electrical leakage in charging cable 3, and an overcurrent in charging cable 3. In the above description of the present example, the duty ratio falls within range d1 of 1% or more and less than 10%, but range d2 of more than 96% and less than 100% may also be employed. Further, both ranges d1 and d2 may be employed or a combination of a part of range d1 and a part of range d2 may be employed.

Control Flow

Figure 8:
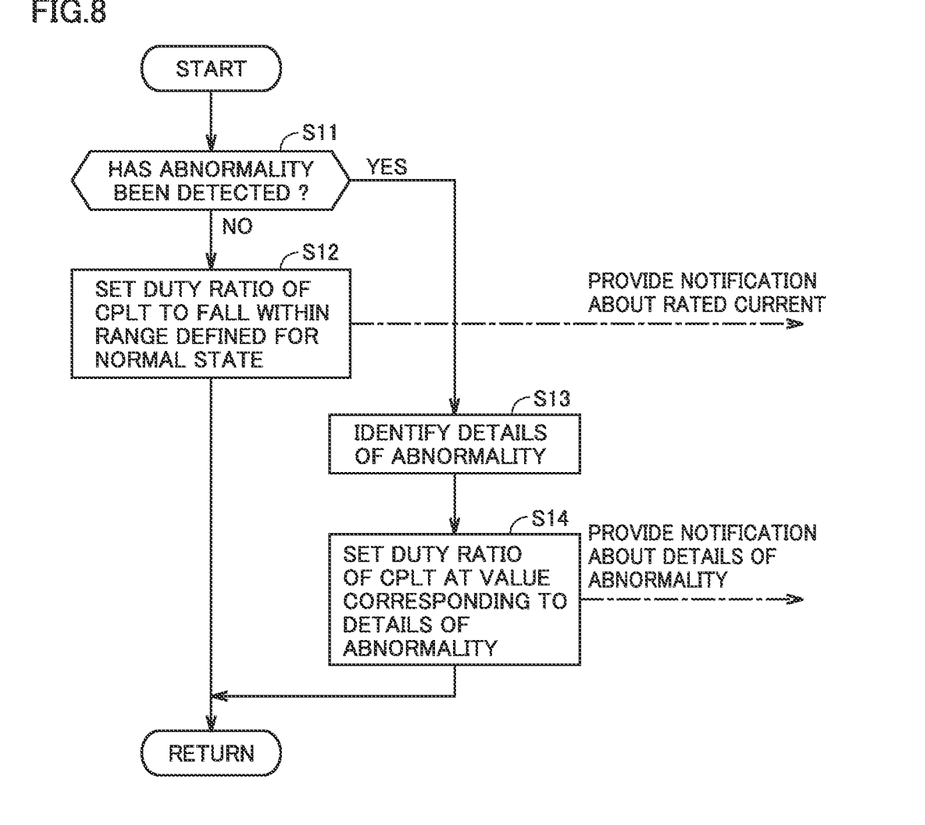
FIG. 8 is a flowchart illustrating a process related to a notification about an abnormality in the charging cable in the first embodiment.

FIG. 8 is a flowchart illustrating a process related to a notification about an abnormality in charging cable 3 in the first embodiment. This flowchart (and each of flowcharts described later) is repeatedly performed for each predetermined computation cycle, for example, in the state where charging cable 3 is connected to inlet 13. Each of the steps is implemented by software processing by charging cable 3 (CCID controller 338) but may be implemented by hardware (an electrical circuit) fabricated in charging cable 3. In the following, a step will be abbreviated to S.

In S11, charging cable 3 determines whether an abnormality has been detected or not in charging cable 3. Based on the explanation about the examples of the above-mentioned four types of abnormalities, the excessive increase in temperature of charging connector 31 can be detected using temperature sensor 311. The excessive increase in temperature of the substrate housed in CCID box 33 can be detected using temperature sensor 337. The electrical leakage in charging cable 3 can be detected using leakage detector 334. The overcurrent in charging cable 3 can be detected using current sensor 332.

When no abnormality is detected in charging cable 3 (NO in S11), charging cable 3 notifies vehicle 1 about the rated current of charging cable 3 using the duty ratio falling within the range defined for a normal state shown in FIG. 5 (within the range from 10% to 96%) (S12). The control pilot signal at this time corresponds to the "first control pilot signal" according to the present disclosure.

On the other hand, when an abnormality is detected in charging cable 3 (YES in S11), charging cable 3 identifies the details (type) of the abnormality detected in S11 (S13). Then, charging cable 3 sets the duty ratio of control pilot signal CPLT at the value corresponding to the identified details of the abnormality (S14). The control pilot signal at this time corresponds to the "second control pilot signal" according to the present disclosure.

Thereby, vehicle 1 can recognize occurrence of an abnormality in charging cable 3 and also can recognize what kind of abnormality occurs. Consequently, for example, vehicle 1 can stop plug-in charging depending on the details of the abnormality occurring in charging cable 3 or can inform a user or an external server that charging cable 3 needs to be repaired. For informing a user or an external server about needs of repair, HMI 18 such as an on-vehicle display may be used in place of or in addition to communication module 19.

As described above, in the first embodiment, the range of the duty ratio that is not allocated for notification about the rated current of charging cable 3 is allocated in order to provide a notification about the details of the abnormality in charging cable 3. In other words, the use of the existing control pilot signal CPLT is widened so as to make use of control pilot signal CPLT also for notification about the details of an abnormality in charging cable 3. Thereby, according to the first embodiment, vehicle 1 can be notified about the details of the abnormality occurring in charging cable 3 without providing an additional signal line in charging cable 3.

Modification of First Embodiment

Figure 9:
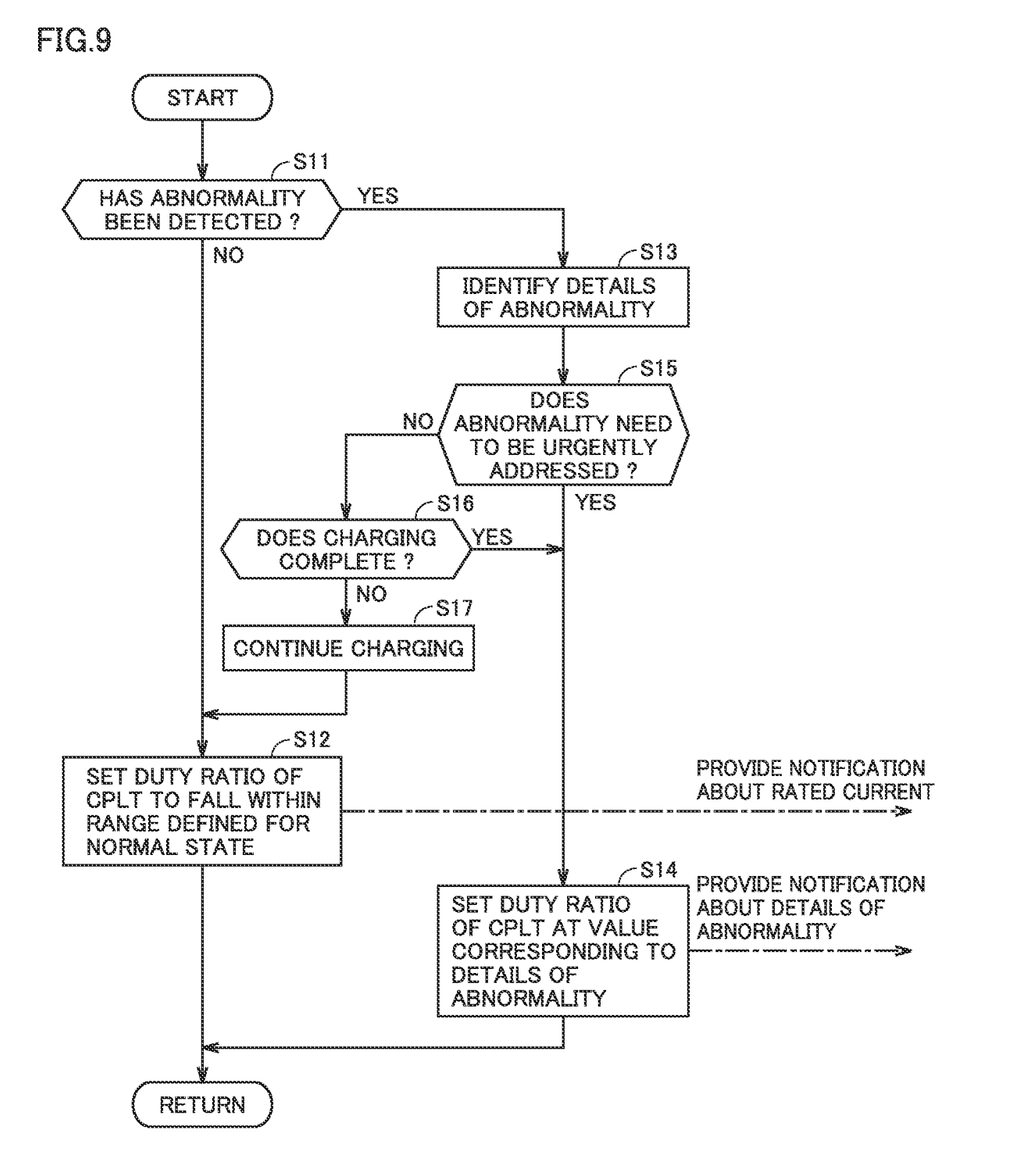
FIG. 9 is a flowchart illustrating a process related to a notification about an abnormality in a charging cable in a modification of the first embodiment.

FIG. 9 is a flowchart illustrating a process related to a notification about an abnormality in a charging cable 3 in a modification of the first embodiment. In the present modification, after the details of the abnormality are identified in S13, the timing of providing a notification from charging cable 3 to vehicle 1 is set in accordance with the details of the abnormality. More specifically, the flowchart in the present modification is different from the flowchart (see FIG. 8) in the first embodiment in that it further includes a process in S15 to S17.

In S15, charging cable 3 determines whether the abnormality occurring in charging cable 3 needs to be urgently addressed or not. In the above-mentioned example, an electrical leakage or an overcurrent in charging cable 3 can be classified into an abnormality that needs to be urgently addressed (the first abnormality). In contrast, the temperature increase in charging connector 31 or CCID box 33 can be classified into an abnormality that does not need to be urgently addressed (the second abnormality) though the classification may depend on the increasing degree of temperature. Thus, the information about whether the abnormality needs to be urgently addressed or not is determined in advance and then provided to charging cable 3 (CCID controller 338).

When the abnormality occurring in charging cable 3 needs to be urgently addressed (YES in S15), then, as in the first embodiment, charging cable 3 sets the duty ratio of control pilot signal CPLT at a value corresponding to the details of the abnormality to thereby immediately notify vehicle 1 about the details of the abnormality (S14).

On the other hand, when the abnormality occurring in charging cable 3 does not need to be urgently addressed (NO in S15), charging cable 3 continues charging control as normally performed, until plug-in charging completes (NO in S16 and then proceeds to S17). When plug-in charging completes (YES in S16), charging cable 3 sets the duty ratio of control pilot signal CPLT at a value corresponding to the details of the abnormality to thereby notify vehicle 1 about the details of the abnormality (S14).

As described above, according to the present modification, when the abnormality occurring in charging cable 3 does not need to be urgently addressed, the timing of providing a notification about the abnormality details is set at a timing after plug-in charging is completed. This allows more reliable completion of plug-in charging of vehicle 1.

Second Embodiment

In the description about the configuration in the first embodiment, the duty ratio of control pilot signal CPLT is used for providing a notification about the details of the abnormality occurring in charging cable 3. In the following description about a configuration in the second embodiment, the frequency of control pilot signal CPLT is used for providing the notification.

Figure 10:
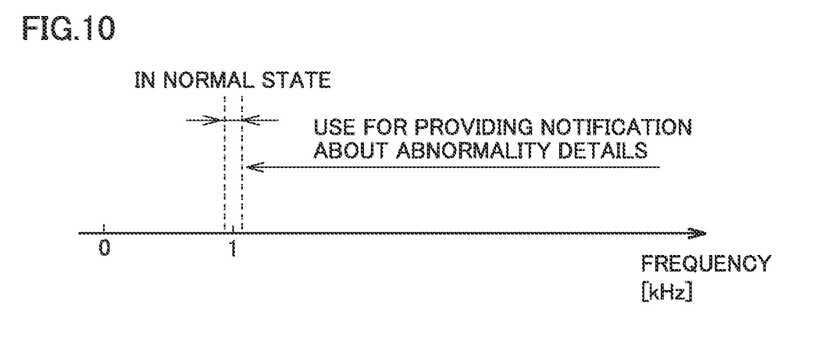
FIG. 10 is a diagram showing an entire image of information allocated to a control pilot signal in a second embodiment.

FIG. 10 is a diagram showing an entire image of information allocated to control pilot signal CPLT in the second embodiment. As described above, the frequency of control pilot signal CPLT is fixed at 1 kHz in a normal state. In the present embodiment, a frequency other than 1 kHz, preferably a frequency higher than 1 kHz, may be allocated for providing a notification about the details of the abnormality in charging cable 3.

Figure 11:
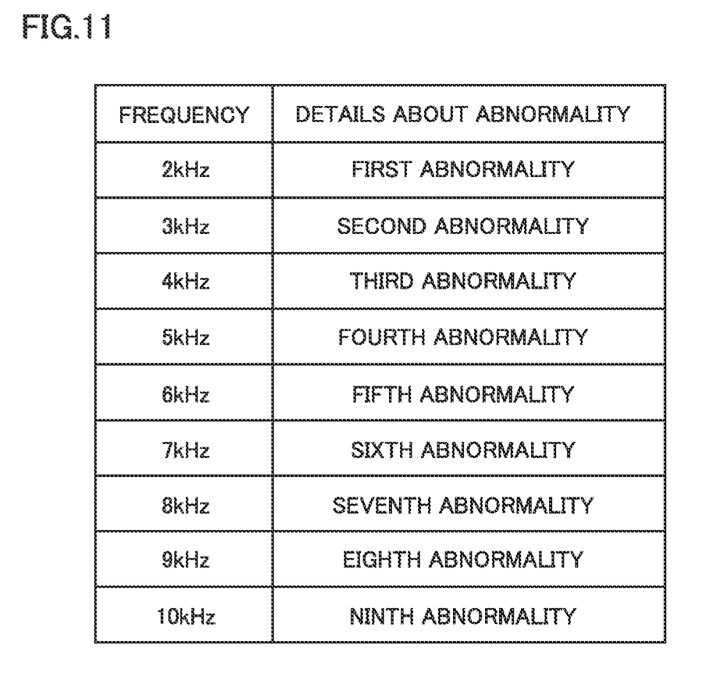
FIG. 11 is a conceptual diagram showing allocation of notification details about an abnormality to the control pilot signal in the second embodiment.

FIG. 11 is a conceptual diagram showing allocation of notification details about an abnormality to control pilot signal CPLT in the second embodiment. In the present example, a different type of abnormality is allocated for each 1 kHz of the frequency of control pilot signal CPLT. In other words, when the frequency is 2 kHz, it means that the first abnormality occurs in charging cable 3. When the frequency is 3 kHz, it means that the second abnormality occurs in charging cable 3. When the frequency is 4 kHz, it means that the third abnormality occurs in charging cable 3. The same is applied also in the case where the frequency is 5 kHz or more.

Figure 12:
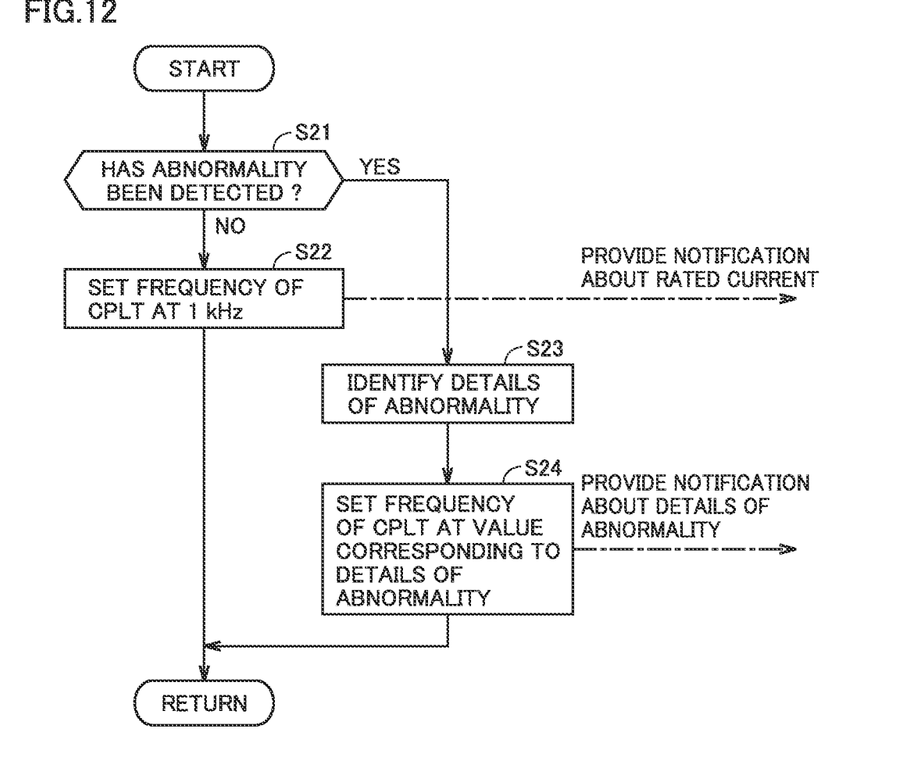
FIG. 12 is a flowchart illustrating a process related to a notification about an abnormality in a charging cable in the second embodiment.

FIG. 12 is a flowchart illustrating a process related to a notification about an abnormality in charging cable 3 in the second embodiment. The process in S21 is the same as the process of detecting an abnormality (the process in S11 in FIG. 8) in the first embodiment.

When no abnormality is detected in charging cable 3 (NO in S21), charging cable 3 notifies vehicle 1 about the rated current of charging cable 3 using the duty ratio falling within the range defined for a normal state (within the range from 10% to 96%) shown in FIG. 5 in the state where the frequency of control pilot signal CPLT is kept fixed at a specific value (=1 kHz) (S22).

On the other hand, when an abnormality is detected in charging cable 3 (YES in S21), charging cable 3 identifies the details of the abnormality detected in S21 (S23). Then, charging cable 3 sets the frequency of control pilot signal CPLT at a value corresponding to the identified details of the abnormality (S24). The duty ratio of control pilot signal CPLT is not particularly limited but can be set, for example, at a prescribed value falling within the range defined for the normal state (within the range from 10% to 96%).

Thereby, vehicle 1 can recognize occurrence of an abnormality in charging cable 3 and also can recognize what kind of abnormality occurs. Consequently, for example, vehicle 1 can stop plug-in charging depending on the details of the abnormality occurring in charging cable 3 or can inform a user that charging cable 3 needs to be repaired.

As described above, in the second embodiment, the frequency that is not used when providing a notification about the rated current of charging cable 3 is allocated in accordance with the details of the abnormality in charging cable 3. Since the existing control pilot signal CPLT is used also in the second embodiment, vehicle 1 can be notified about the details of the abnormality occurring in charging cable 3 without providing an additional signal line in charging cable 3, as in the first embodiment.

Note that the first embodiment and the second embodiment can also be combined as appropriate. Specifically, in providing a notification about the details of the abnormality in charging cable 3, a combination of the frequency and the duty ratio that are not used for providing a notification about the rated current of charging cable 3 may be used.

Third Embodiment

In the following description about a configuration in the third embodiment, a notification about the details of an abnormality in charging cable 3 can be provided using a duty ratio falling within a range defined for the normal state.

Figure 13:
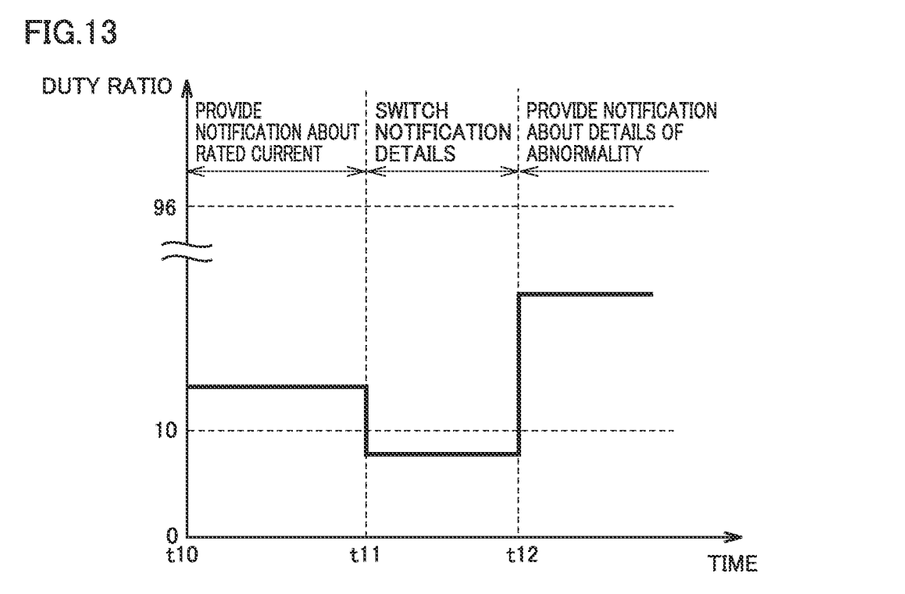
FIG. 13 is a diagram for illustrating a change in a duty ratio of a control pilot signal in a third embodiment.

FIG. 13 is a diagram for illustrating a change in a duty ratio of control pilot signal CPLT in the third embodiment. In FIG. 13, the horizontal axis represents elapsed time while the vertical axis represents the duty ratio of control pilot signal CPLT.

It is assumed in the following description that, at initial time t10, no abnormality is detected in charging cable 3 and plug-in charging is normally performed. In this case, vehicle 1 (CPU 125) detects the duty ratio of control pilot signal CPLT to thereby acquire the rated current of charging cable 3. The duty ratio falls within the range from 10% to 96% (for example, 20%) of the duty ratio defined for a normal state.

When an abnormality is detected in charging cable 3 at time t11, charging cable 3 (CCID controller 338) temporarily changes the duty ratio of control pilot signal CPLT to fall out of the range that is defined for the normal state. In the example shown in FIG. 13, the duty ratio is decreased to a value (for example, 8%) lower than the lower limit value (10%) defined for the normal state. Thereby, vehicle 1 can recognize that the details about the notification provided using the duty ratio of control pilot signal CPLT have been switched from the information about the rated current of charging cable 3 to the information about the details of the abnormality in charging cable 3.

At time t12, CCID controller 338 returns the duty ratio of control pilot signal CPLT to the value falling within the range defined for the normal state (for example, 40%). At this time, a different duty ratio is allocated for each details of the abnormality in charging cable 3. Therefore, vehicle 1 can acquire the details of the abnormality in charging cable 3 by the duty ratio of control pilot signal CPLT, as in the first embodiment.

The range of the duty ratio of control pilot signal CPLT in the normal state is as wide as 10% to 96% and extends over most part of the entire range (see FIG. 5). Thus, when the duty ratio of control pilot signal CPLT is changed to a value falling out of the range defined for the normal state so as to provide a notification about the details of the abnormality in charging cable 3 as described in the first embodiment, the duty ratio needs to be highly accurately controlled within a narrow range. For example, when a different type of abnormality is allocated for each 1% in the range of 1% to 9% of the duty ratio as described with reference to FIG. 7, it becomes necessary for charging cable 3 that the duty ratio is controlled more accurately than in the case of 1% of the duty ratio. This may require a high degree of difficulty in designing charging cable 3.

In contrast, in the third embodiment, the value within the range defined for the normal state is used for the duty ratio of control pilot signal CPLT, and thus, the range that can be used for providing a notification about the details of the abnormality in charging cable 3 is wide. Accordingly, a different type of abnormality can be allocated for each duty ratio wider than that in the first embodiment (for example, for each 3%, for each 5% and the like of the duty ratio). This increases the margin of error allowable for controlling the duty ratio, so that the degree of design difficulty of charging cable 3 can be lowered.

Figure 14:
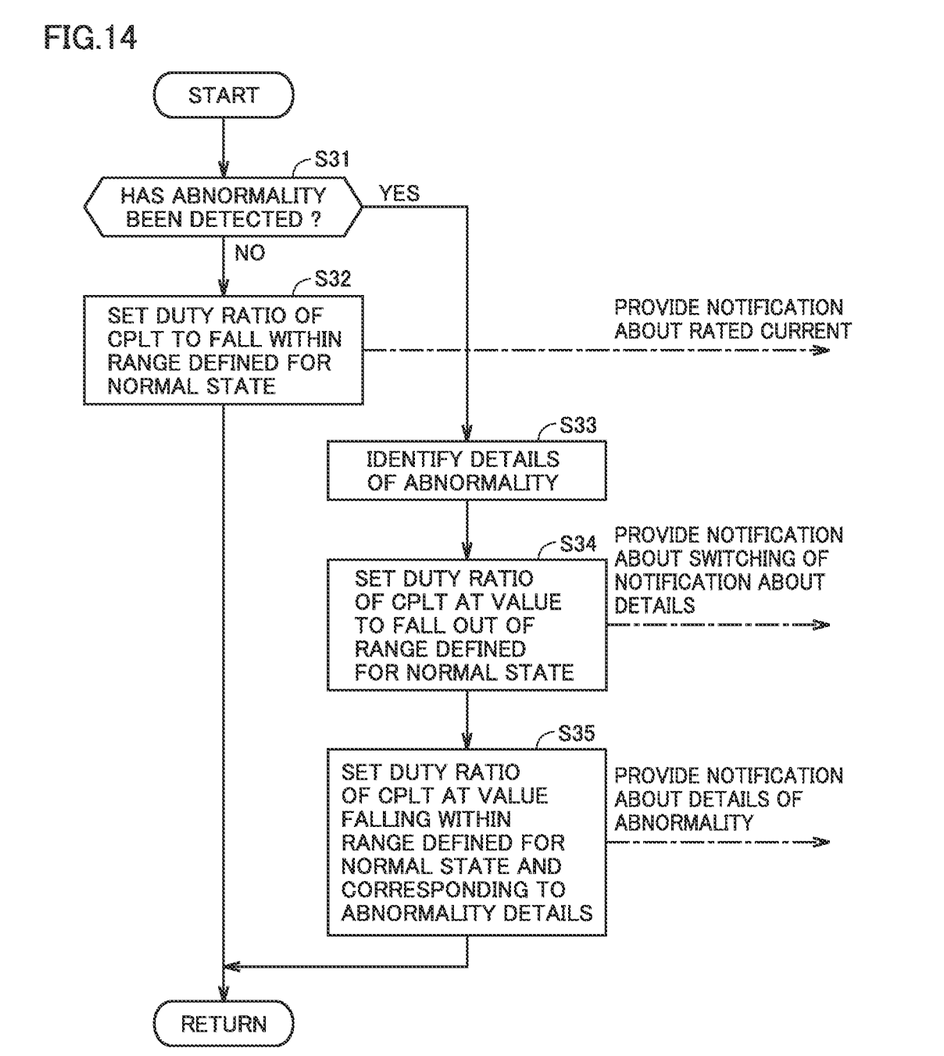
FIG. 14 is a flowchart illustrating a process related to a notification about an abnormality in a charging cable in the third embodiment.

FIG. 14 is a flowchart illustrating a process related to a notification about an abnormality in charging cable 3 in the third embodiment. The process in S31 and S32 is the same as the corresponding process (the process in S11 and S12 in FIG. 8) in the first embodiment.

When an abnormality is detected in charging cable 3 (YES in S31), charging cable 3 identifies the details of the abnormality detected in S31 (S33). Charging cable 3 temporarily sets the duty ratio of control pilot signal CPLT at a value falling out of the range defined for the normal state (S34). Thereby, vehicle 1 is notified that the details about the notification provided by the duty ratio of control pilot signal CPLT have been switched from the rated current of charging cable 3 to the details of the abnormality in charging cable 3. The control pilot signal at this time corresponds to the "first signal of the second control pilot signal" according to the present disclosure.

In S35, charging cable 3 sets the duty ratio of control pilot signal CPLT at a value set to fall within the range defined for a normal state and corresponding to the abnormality details. Thereby, vehicle 1 can recognize occurrence of an abnormality in charging cable 3 and also can recognize what kind of abnormality occurs. The frequency of control pilot signal CPLT can be fixed at a value defined for the normal state (1 kHz). The control pilot signal at this time corresponds to the "second signal of the second control pilot signal" according to the present disclosure.

As described above, in the third embodiment, switching of the notification about the details that is provided by the duty ratio is triggered by temporarily switching the duty ratio of control pilot signal CPLT to fall out of the range defined for the normal state. Thereby, a notification about the details of the abnormality in charging cable 3 can be provided using the duty ratio falling within the range defined for the normal state. Since the existing control pilot signal CPLT is used also in the third embodiment, vehicle 1 can be notified about the details of the abnormality occurring in charging cable 3 without providing an additional signal line in charging cable 3, as in the first and second embodiments.

Also in the third embodiment, the signal indicating switching of the notification about the details that is provided by the duty ratio of control pilot signal CPLT may be a signal that is different in frequency from the value in the normal state (1 kHz).

Note that each of temperature sensor 311, current sensor 332, leakage detector 334, and temperature sensor 337 corresponds to the "abnormality detection unit" according to the present disclosure. CCID controller 338 corresponds to the "controller" according to the present disclosure.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A charging cable that electrically connects a vehicle and a charging facility, the charging cable comprising:
an abnormality detection unit that detects an abnormality in the charging cable;
a control pilot signal line; and
a controller that outputs a first control pilot signal to the control pilot signal line to notify the vehicle about a rated current of the charging cable, wherein
the first control pilot signal is an oscillating signal that provides a notification about the rated current in a state where a duty ratio of the first control pilot signal is controlled to fall within a prescribed range while a frequency of the first control pilot signal is fixed to a specific value,
when the abnormality detection unit detects the abnormality, the controller switches from outputting the first control pilot signal to outputting a second control pilot signal for notifying the vehicle about details of the abnormality to the control pilot signal line, and
the second control pilot signal is different in at least one of a frequency and a duty ratio from the first control pilot signal.

2. The charging cable according to claim 1, wherein the second control pilot signal provides a notification about the details of the abnormality as a duty ratio of the second control pilot signal is controlled to fall out of the prescribed range.

3. The charging cable according to claim 1, wherein the second control pilot signal provides a notification about the details of the abnormality as a frequency of the second control pilot signal is controlled to fall within a range not including the specific value.

4. The charging cable according to claim 1, wherein
the second control pilot signal includes a first signal and a second signal that is output after the first signal is output,
the first signal shows switching of a notification provided from the charging cable to the vehicle as a duty ratio of the first signal is controlled to fall out of the prescribed range, and
the second signal provides a notification about the details of the abnormality as a duty ratio of the second signal is controlled to fall within the prescribed range.

5. The charging cable according to claim 1, wherein
the abnormality detected by the abnormality detection unit is classified into a first abnormality and a second abnormality,
when the abnormality is the first abnormality, the controller outputs the second control pilot signal to the control pilot signal line immediately after detection of the abnormality so as to stop charging of the vehicle, and
when the abnormality is the second abnormality, the controller outputs the second control pilot signal to the control pilot signal line after charging of the vehicle ends.

6. A charging system comprising:
the charging cable according to claim 1; and
the vehicle, wherein
the vehicle includes at least one of
an interface that informs a user about the details of the abnormality, and
a communication module that transmits the details of the abnormality to an external server.

7. A method of charging a vehicle using a charging cable including a control pilot signal line, the method comprising:
when no abnormality is detected in the charging cable, notifying the vehicle about a rated current of the charging cable using a first control pilot signal that is transmitted through the control pilot signal line; and
when an abnormality is detected in the charging cable, notifying the vehicle about details of the abnormality in the charging cable by switching the first control pilot signal to a second control pilot signal that is transmitted through the control pilot signal line, wherein the first control pilot signal provides a notification about the rated current in a state where a duty ratio of the first control pilot signal is controlled to fall within a prescribed range while a frequency of the first control pilot signal is fixed to a specific value, and the second control pilot signal is different in at least one of a frequency and a duty ratio from the first control pilot signal.

* * * * *